2 Sheets—Sheet 1.
L. W. STOCKWELL.
Machine for Threading and Cutting Off Pipes.
No. 217,302. Patented July 8, 1879.
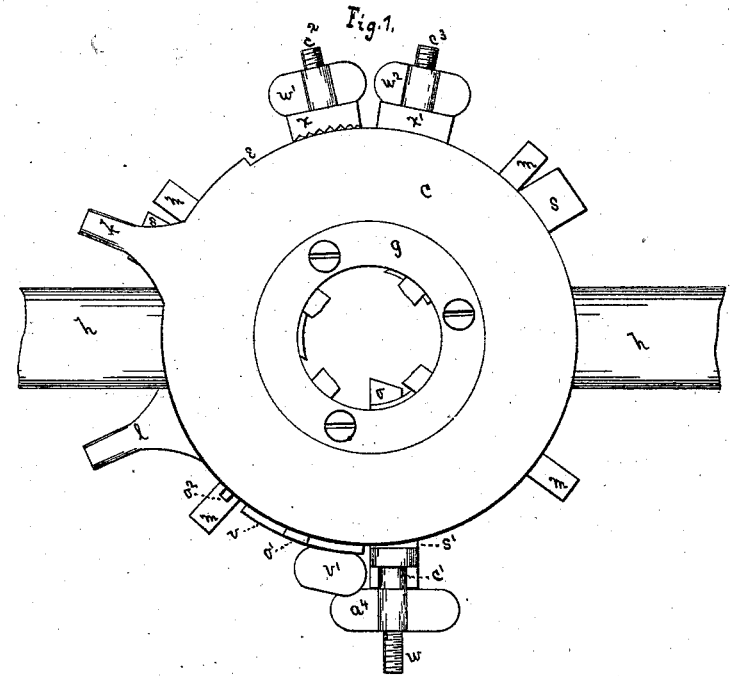
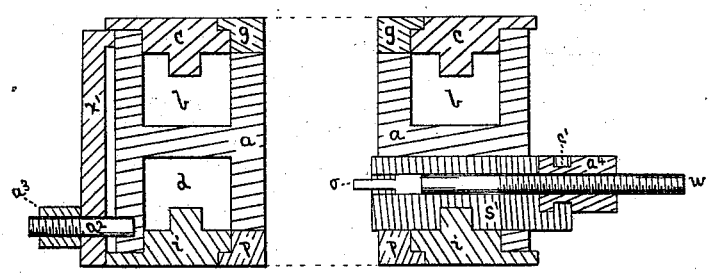

2 Sheets—Sheet 2.

L. W. STOCKWELL.
Machine for Threading and Cutting Off Pipes.

No. 217,302. Patented July 8, 1879.

Witnesses
Geo. F. Robinson
A. D. Knapp

Inventor
Levi W. Stockwell
by Bradford Howland
his Attorney

UNITED STATES PATENT OFFICE.

LEVI W. STOCKWELL, OF RAVENNA, OHIO.

IMPROVEMENT IN MACHINES FOR THREADING AND CUTTING OFF PIPES.

Specification forming part of Letters Patent No. 217,302, dated July 8, 1879; application filed June 1, 1878.

*To all whom it may concern:*

Be it known that I, LEVI W. STOCKWELL, of Ravenna, Portage county, Ohio, have invented a new and useful Improvement in Machines for Threading and Cutting Off Gas-Pipes, which improvement is fully set forth in the following specification.

The drawings hereto annexed, consisting of two sheets, form a part of this specification.

The object of my invention is to facilitate the placing of the threading-dies in the machine in the proper position with reference to the cams which move them to adjust the movement and positions of the cams, and to cut off the pipe by means of a cutting-tool having a threaded shank.

Figure 3:
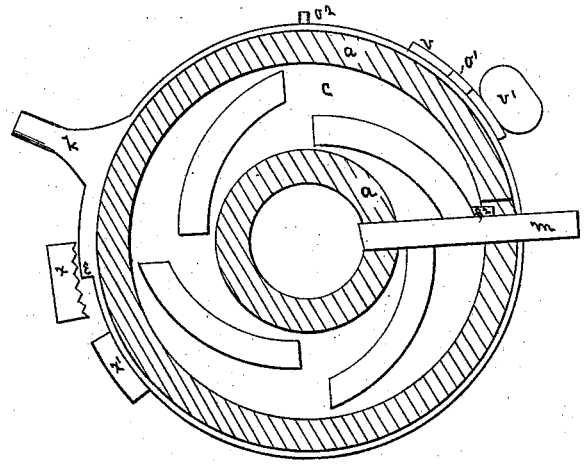
Figure 4:
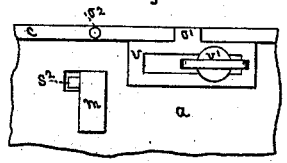
Figure 5:

Figure 1 is a front view of the machine. Fig. 2 is a sectional view. Fig. 3 is a section. Fig. 4 is a side view of part of the machine. Fig. 5 shows the inner end of guide $s^1$.

The handles $h\ h$ are attached to opposite sides of the circular frame $a$, with which all the operating parts are connected.

The cam-rings $c$ and $i$ are placed against the ends of frame $a$, with their concentric cams in the circular grooves $b\ d$, and held in position by face-plates $g$ and $p$, so that the cams may be turned by their handles $k$ and $l$, to move the dies $m\ m\ m\ m$ and the guides $s\ s\ s'$. The cams enter notches in the dies and guides.

The cutting-off tool $o$ rests in a groove in the side of guide $s^1$, near its inner end, Fig. 5, and the threaded shank $w$ of tool $o$ extends lengthwise through guide $s^1$, which is grooved and shaped at $c'$ to receive the threaded nut $a^4$. Tool $o$ is fed to cut off pipe by turning screw-nut $a^4$.

The guides $s\ s\ s^1$ are placed a little out of radial line, so that tool $o$ will be in proper position to cut pipe.

When the threading-dies $m\ m\ m\ m$ are to be operated, tool $o$ should be withdrawn by screw-nut $a^4$ within guide $s^1$.

The guides $s\ s\ s^1$ are moved in against the pipe to be threaded by turning cam-ring $i$ by its handle $l$. Cam-ring $i$ is then held in position by turning nut $a^3$ on screw $a^2$, Fig. 2, and thus pressing bar $x'$ firmly against the cam-ring $i$. The dies $m\ m\ m\ m$ are then moved in till properly adjusted for threading the pipe by turning cam-ring $c$ by its handle $k$, and are held in position by tightening nut $w'$ on screw $c^2$ against bar $x$. The slotted gage or stop $v$ should then be placed with its projection $o^1$ in contact with pin $o^2$ on the circumference of cam-ring $c$, and firmly fastened by turning thumb-screw $v'$.

When the pipe has been threaded the dies are withdrawn by loosening nut $w'$ and turning cam-ring $c$.

Other pipes of the same size may be threaded without readjusting the dies by simply turning cam-ring $c$ till its pin $o^2$ is in contact with projection $o^1$ of gage $v$.

When the dies are operating, the guides $s\ s\ s^1$ keep them at right angles to the pipe, so as to cut a true and uniform thread.

In cutting off pipe, guide $s^1$, being with the other guides in contact with the pipe, forms a firm support for tool $o$ close to the pipe.

There is sufficient space between each cam and its adjacent cam on cam-ring $c$ to permit the dies to be withdrawn from frame $a$ when cam-ring $c$ has been turned till the cams are out of the notches in the dies. This can be done by moving bar $x$ away from cam-ring $c$ sufficiently to permit shoulder $e$ on the cam-ring to pass under bar $x$, as shown in Fig. 3. The dies are prevented from becoming dislodged from the cams while the machine is in operation by the contact of shoulder $e$ with bar $x$. Guide $s^1$ may be removed in a similar manner.

When the dies are being placed in the machine, a pin or projection, $s^2$, on one side of each die $m$, at the back side of the notch which the cam enters, by contact with the cam, Fig. 3, arrests the die at the proper position for the cam to enter it.

I claim as my invention—

1. The adjustable cam-ring $c$, provided with shoulder $e$, and having spaces between the ends of the cams for the passage of the dies, in combination with stop-bar $x$ and the dies $m$, provided with thumb-screw $w'$, by which it may be rendered disengageable with shoulder $e$, substantially as described.

2. The die $m$, having a side projection, $s^2$, at the notch which is entered by the cam on cam-ring $c$, in combination with the cam-ring and the frame $a$, substantially as described.

LEVI W. STOCKWELL.

Witnesses:
   GEO. F. ROBINSON,
   BRADFORD HOWLAND.